United States Patent [19]
Watson

[11] Patent Number: 5,175,592
[45] Date of Patent: Dec. 29, 1992

[54] ELECTRO-OPTIC APPARATUS

[75] Inventor: Jeffrey Watson, Basingstoke, England

[73] Assignee: Smiths Industries Public Limited Company, London, England

[21] Appl. No.: 804,399

[22] Filed: Dec. 10, 1991

[30] Foreign Application Priority Data

Dec. 31, 1990 [GB] United Kingdom ............... 9028215

[51] Int. Cl.⁵ .............................................. G01J 5/24
[52] U.S. Cl. ................................ 356/43; 250/208.6; 250/349
[58] Field of Search ........................... 356/43, 44, 45; 250/349, 578.1, 208.1, 208.6

[56] References Cited

U.S. PATENT DOCUMENTS 4,627,041 12/1986 Uemura ............................. 369/45

FOREIGN PATENT DOCUMENTS 1493963 12/1977 United Kingdom .
2129931  5/1984 United Kingdom .
2157524 10/1985 United Kingdom .
2158228 11/1985 United Kingdom .

Primary Examiner—Vincent P. McGraw
Attorney, Agent, or Firm—Pollock, Vande Sande and Priddy

[57] ABSTRACT

A radiation pyrometer has four rectangular photodiodes mounted in an orthogonal array. Radiation from a hot body is focussed as a circular image centrally of the array. The outputs of diagonally opposite photodiodes are connected together to form two identical output channels.

10 Claims, 4 Drawing Sheets

ELECTRO-OPTIC APPARATUS

BACKGROUND OF THE INVENTION

This invention relates to electro-optic apparatus.

Electro-optic apparatus, such as pyrometers, include an imaging system, such as including a lens, and a detector, such as a photodiode, on which the imaging system images external radiation. In some apparatus a dual-channel output is required, such as when the output is supplied to two different pieces of equipment, or for two different purposes, or where redundancy is required for safety reasons. In order to ensure that both outputs are equal, the two photodiodes must be mounted in such a way that both receive the same amount of radiation, that is, the area of the image that falls on one photodiode must be equal to that which falls on the other. Alternatively, the gain of the amplifiers receiving the outputs of the photodiodes can be adjusted to give equal outputs. If the radiation image is smaller than the area of the photodiodes or if the radiation is uneven over the direction at right angles to the line between the centers of the two photodiodes, will result in a change in output of the photodiodes but it generally affects both photodiodes to the same extent. If, however, the center of the radiation image is displaced in a direction with a component parallel to the line between the two photodiodes, this will generally result in an increase in the output from one photodiode and a reduction in the output from the other.

BRIEF SUMMARY OF THE INVENTION

It is an object of the present invention to provide eletro-optic apparatus which minimizes the effect of relative displacement between a radiation image and a plurality of detectors.

According to the present invention there is provided electro-optic apparatus including an array of at least two pairs of detector means, and imaging means arranged to form a radiation image on the detector means, the detector means of each pair being located diagonally opposite one another, and the outputs of the detector means in each pair being connected together in respective ones of at least two channels such that no substantial change in the output of a channel is produced by a reduction in the area of radiation imaged on one detector means and an equal increase in the area of radiation imaged on the other detector means in the same pair.

The detector means are preferably arranged in an orthogonal array with the imaging device being arranged to form a circular image substantially centrally of the array. The detector means are preferably of rectangular shape, the array being larger in one dimension than in a dimension at right angles to the one dimension. The image may be smaller than a dimension of the array and larger than another dimension of the array which may be at right angles to one dimension. The detector means are preferably photodiodes and may be mounted in thermal contact with a self-regulating heater. The detector means and a signal conditioning circuit may be mounted in a casing, the casing having a connector at one end and a fiber-optic cable at its opposite end by which radiation is supplied to the detector means. The apparatus may be a radiation pyrometer, the imaging means imaging radiation from a radiation-emitting body onto the detector means, and the output of each channel being representative of the temperature of the radiation-emitting body.

A radiation pyrometer for a gas-turbine engine in accordance with the present invention, will now be described, by way of example, with reference to the accompanying drawings.

DESCRIPTION OF THE PREFERRED EMBODIMENTS

Figure 1:
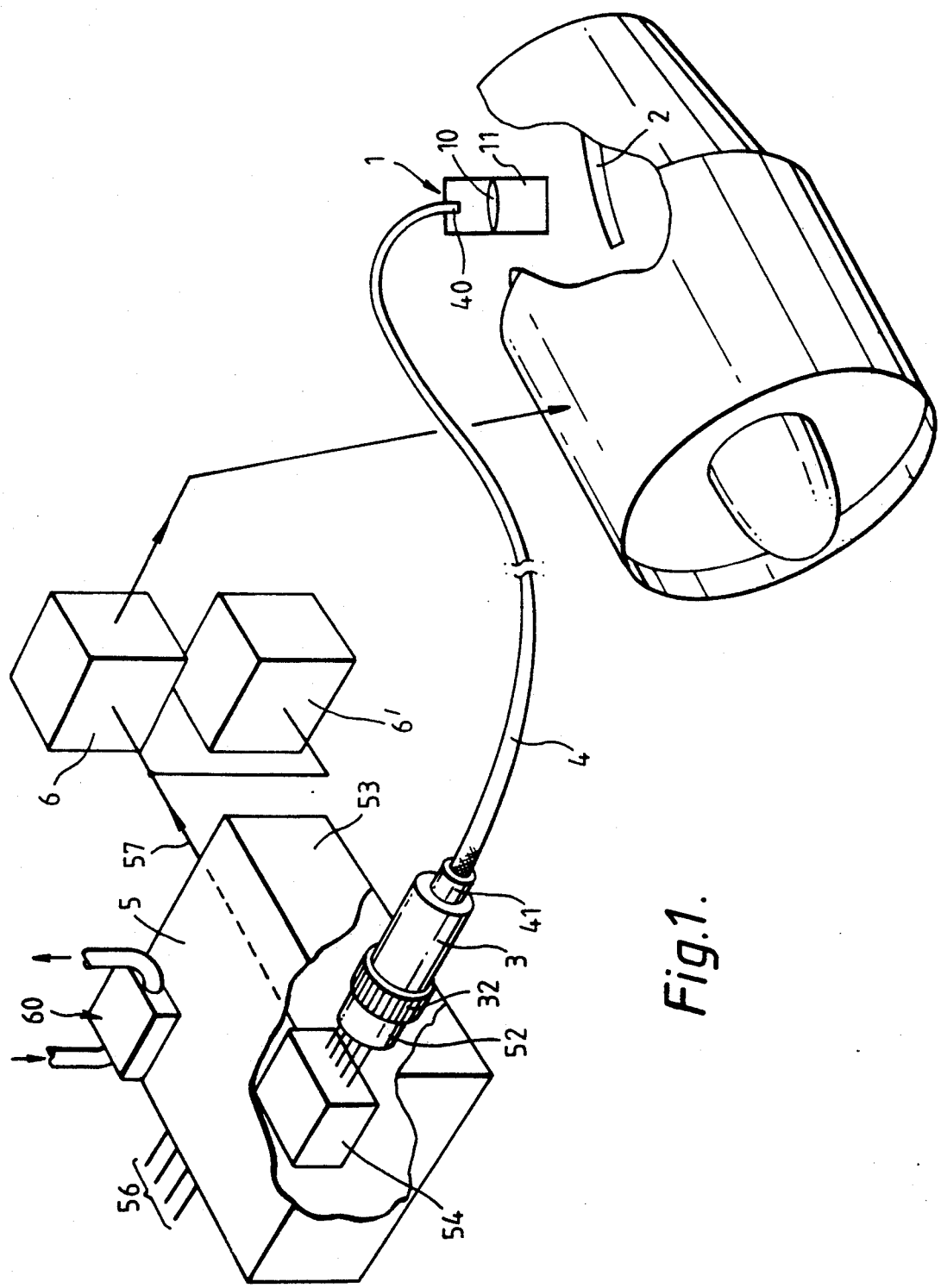
FIG. 1 is a partly cut-away perspective view of the pyrometer and engine.

With reference to FIG. 1, the pyrometer apparatus comprises a pyrometer head 1, mounted to view the blades 2 of a gas-turbine engine, a detector 3 connected with the pyrometer head by means of a cable 4, and a processing unit 5 which receives the detector output and provides a signal related to temperature and other parameters to an engine control unit 6.

The pyrometer head 1 is of conventional construction, such as described in GB 2158576A or GB 1589531, having a heat-resistant converging lens 10 mounted towards the rear of a sighting tube 11. The lens 10 focuses radiation emitted by the blades 2, which enters the sighting tube 11, onto the forward end 40 of the cable 4. The cable 4 is a fiber-optic cable, or some similar optical radiation guide, and is flexible or bendable so that there is freedom in the mounting of the pyrometer head 1 and detector 3. The cable may be armored for protection and is long enough to enable the detector 3, at the rear end 41 of the cable, to be located at a cooler region.

Figure 2:
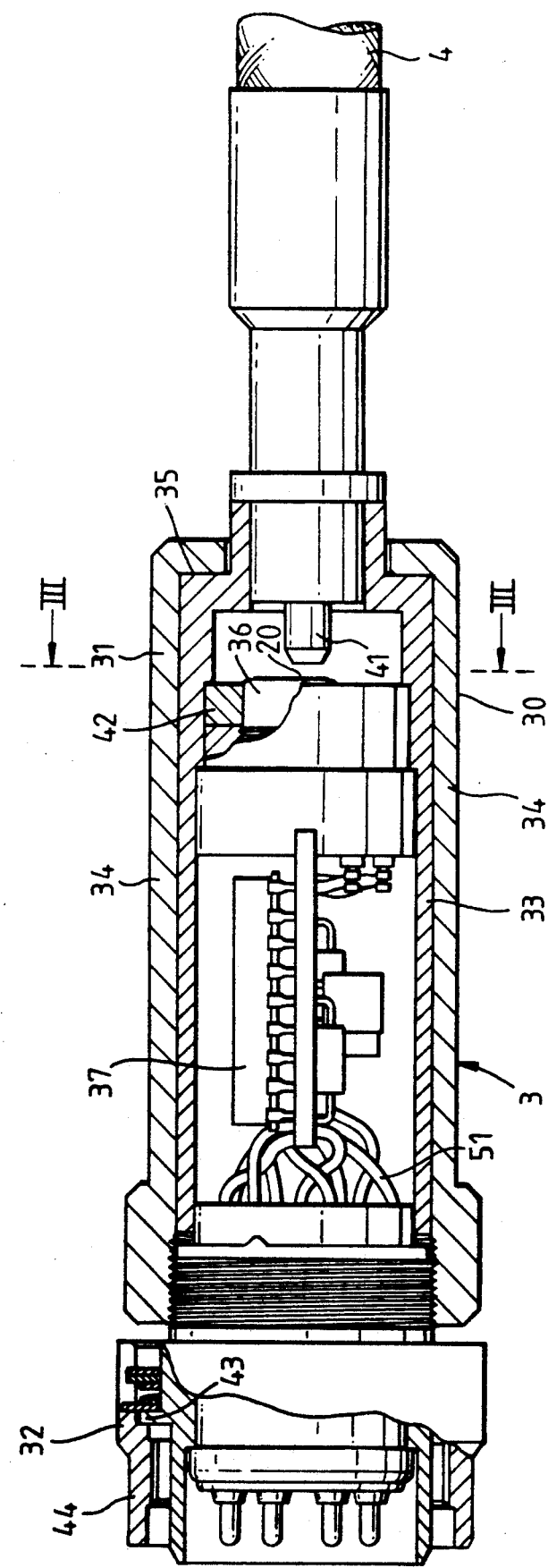
FIG. 2 is a sectional elevation of a part of the pyrometer.

With reference now to FIG. 2, the detector 3 has a cylindrical casing 30 formed by a forward part 31 and rear connector or plug assembly 32. The forward part 31 comprises an inner sleeve 33 welded to the rear end of the cable termination 41, and an outer sleeve 34, the forward end of which engages a shoulder 35 on the inner sleeve and the rear end of which is joined to the plug assembly 32. The overall length of the detector 3 is 60 mm and it has a diameter of 20 mm. Within the forward part 31 of the detector 3 there is mounted a photodiode array 20. The rear end termination 41 of the cable 4 acts as imaging means to form an image on the array 20 of radiation transmitted along the cable 4. In this respect, the termination 41 may include a converging lens. The photodiode array 20 is supported in the inner sleeve 33 by a heat-insulating support ring 42. A self-regulating heating element (not shown) may be mounted in thermal contact with the array 20 to enable its temperature to be raised when necessary.

The electrical output of the photodiode array 20 is supplied to an electrical circuit assembly 37 within the casing 30. The circuit assembly 37 produces electrical signal conditioning of the output of the photodiode array 20 into a form suitable for handling by the processing unit 5. The signals at the output of the circuit assembly 37 are supplied via lines 51 to the plug assembly 32 formed at the rear end of the detector casing 30.

The plug assembly 32 is a multi-pin plug-in mateable connector and includes pins by which electrical power is supplied to the circuit assembly 36. The plug assembly 32 has a radially extending flange 43 that is embraced by an outer, threaded locking ring 44.

The plug assembly 32 on the detector 3 is arranged to mate directly with a cooperating connector 52 on the casing 53 of the processing unit 5. The connector 52 has a flat surface (not shown) against which the flange 43 on the connector 32 is abutted in good thermal contact. The processing unit 5 contains electronic processing circuits, indicated generally by the numeral 54. These circuits are connected to the connector 52 so as to receive the signal conditioned output of the photodiode array 20 in the detector 3. The processing unit 5 also receives inputs on line 56 from various other sensors and control devices indicative of, for example, speed, temperature and pressure, and provides an output to the engine control unit 6. The processing unit 5 includes a thermal transfer unit 60 mounted on its casing 53 which is supplied with a fluid, such as liquid fuel, to effect heat transfer, and, more particularly, cooling of the processing unit 5.

Figure 3:
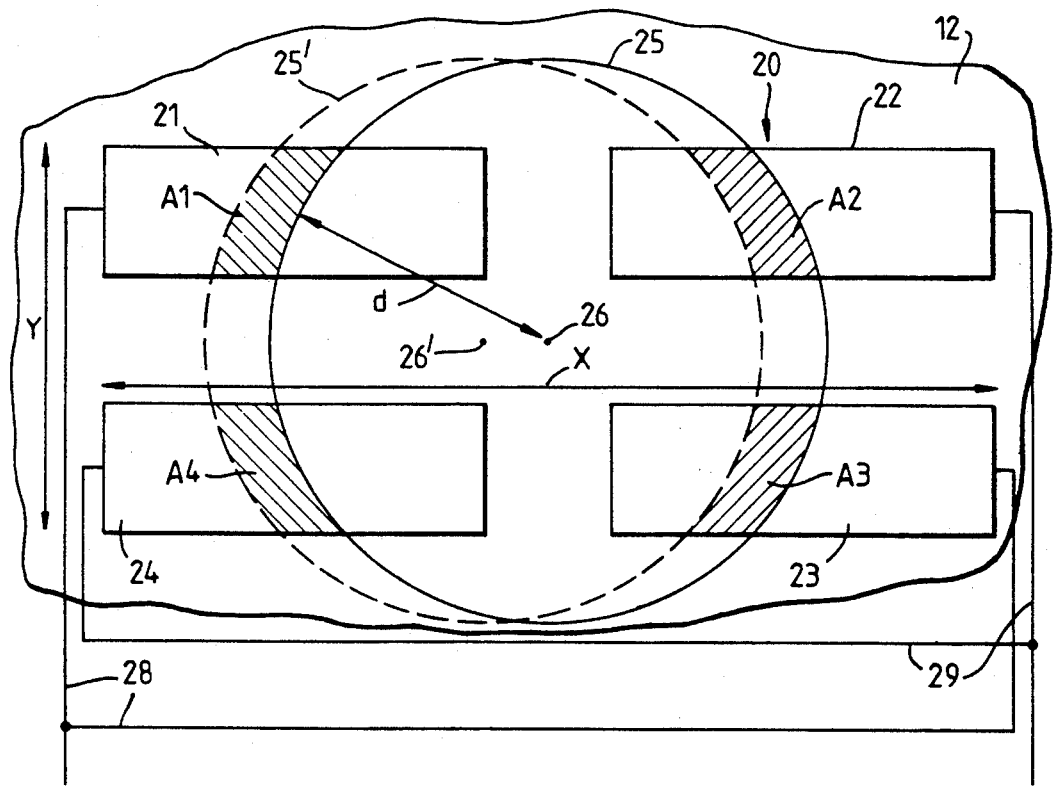
FIGS. 3 to 5 are transverse sections along the line III—III of FIG. 2 showing the effect of relative displacement of a radiation image on the pyrometer detector array.

As so far described, the apparatus is conventional, being as described in GB 2198259. The photodiode array 20 differs from previous arrangements in that it includes an orthogonal array of four separate photodiodes 21 to 24, as shown in FIG. 3.

The photodiodes 21 to 24 are preferably formed on a common substrate 12 and are each of rectangular shape, being longer in the horizontal, x direction than in the vertical, y direction. The photodiodes 21 to 24 could instead be square or of other shape. The photodiodes 21 to 24 are arranged in an orthogonal array with their sides parallel and equally spaced from one another. Radiation from the rear end 41 of the cable 4 forms a circular image 25 on the assembly, 20, the center 26 of which is located at the center of the assembly. The diameter d of the image 25 is greater than the y dimension Y of the assembly 20, but less than the x dimension X. It can be seen that the area of the light imaged on each photodiode 21 to 24 is equal and, therefore, that their outputs will each be equal. However, assembly inaccuracies or vibration during use, for example, can result in misalignment of the image 25 and the assembly 20. For example, the image might be displaced to the left, to the position 25' represented by the broken line in FIG. 3. This would result in an increase A1 in the area of radiation falling on diode 21, a decrease A2 in that falling on diode 22, a decrease A3 in that falling on diode 23 and an increase A4 in that falling on diode 24. The areas A1 to A4 are all equal in size. The outputs from the diagonally opposite diodes 21 and 23 are coupled together in one channel by wires 28; similarly, the outputs from the other pair of diagonally opposite diodes 22 and 24 are coupled together by wires 29. In this way, the outputs in the two channels are both unchanged because the movement of the radiation image relative to the assembly affects the two diodes in each channel in equal but opposite amounts.

Figure 4:
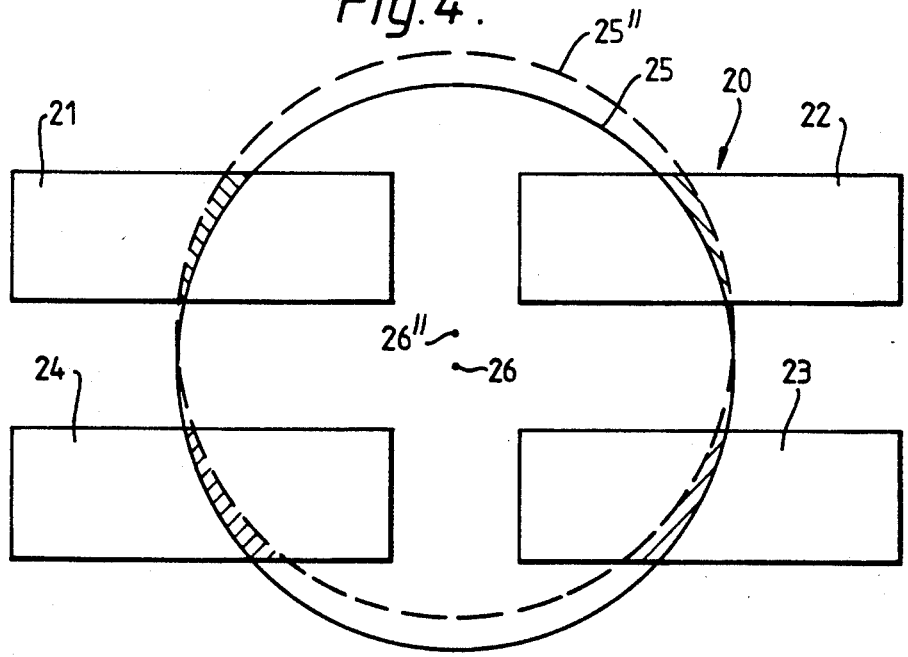

If the image 25 were instead displaced vertically up relative to the assembly 20, as shown by the broken line 25" in FIG. 4, the outputs from the upper diodes 21 and 22 would increase whereas the outputs from the lower diodes 23 and 24 would decrease by the same amount. It can be seen that this would still maintain constant outputs in the two channels because of the pairing of upper and lower diodes.

Figure 5:
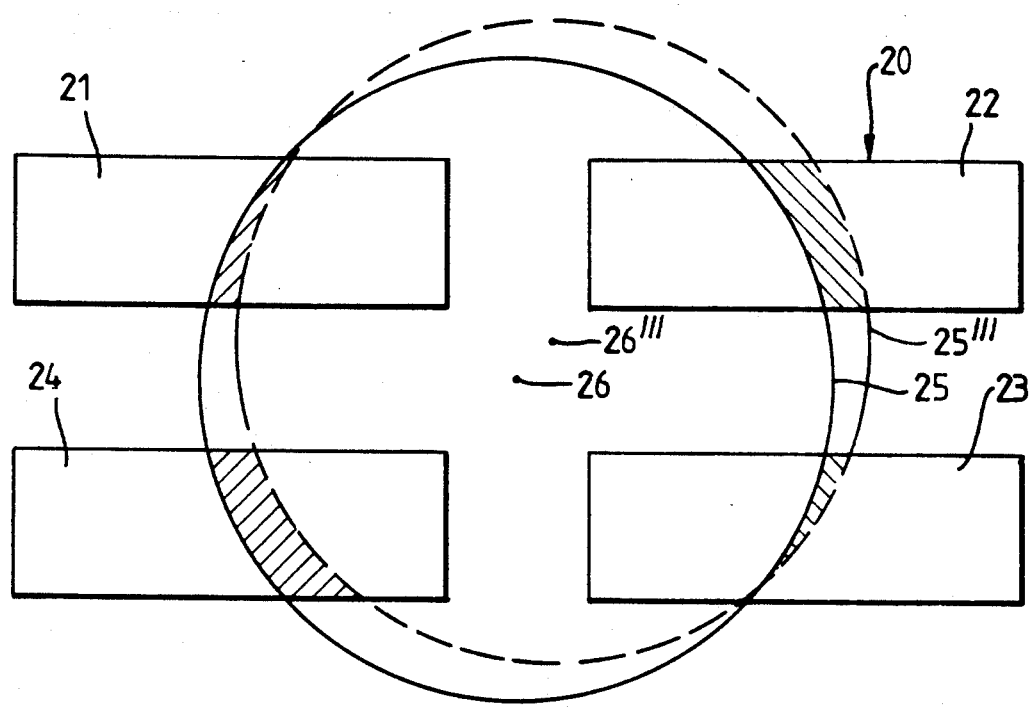

FIG. 5 shows what happens if the relative displacement between the radiation images 25 and 25''' and the photodiodes assembly 20 were not along the x or y axis. From this, it can be seen that the change in area of image falling on each photodiode is different for each of the photodiodes and that there will, therefore, be a change in the output of the two channels. For each pair of photodiodes, however, there is an increase in area imaged on one photodiode and a decrease in that imaged on the other photodiode. The overall change for each pair is, therefore, subtractive, tending to reduce the change in output. The effect is consequently less than in previous apparatus, where only two photodiodes were used, which would be equivalent to pairing together adjacent photodiodes such as 21 and 24, and 22 and 23, or 21 and 22, and 23 and 24.

Figure 6:
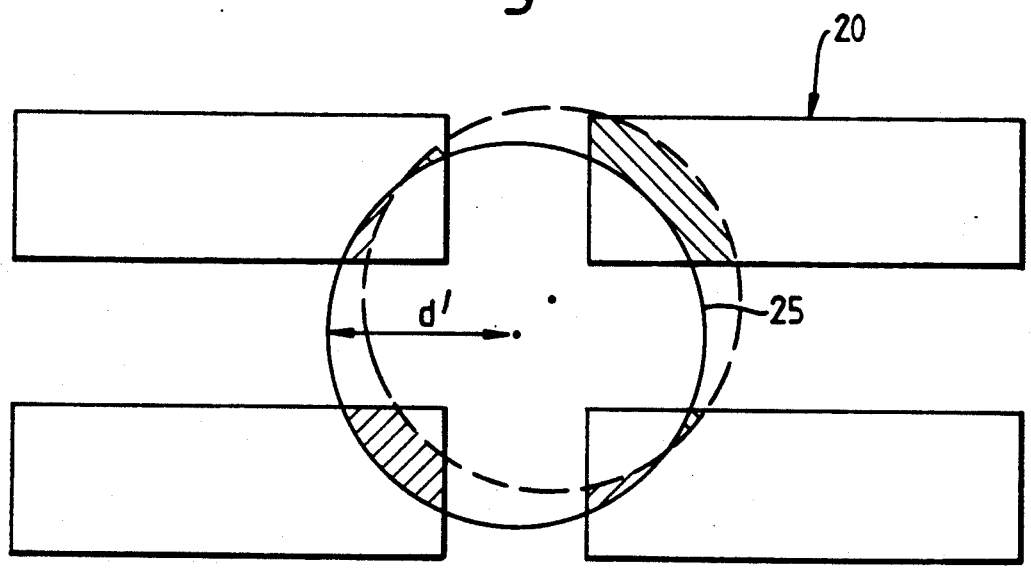
FIG. 6 is a transverse section along the line III—III showing the effect of displacement of a smaller radiation image.

If the diameter d' of the radiation image 25 were less than both the height Y and width X of the photodiode assembly 20, as shown in FIG. 6, a displacement in the direction shown in FIG. 5 would produce an increase or decrease in the channel outputs but this would be the same for both channels.

By using two pairs of detectors located diagonally opposite one another, the effect of small errors in alignment of the detector assembly and the imaging system, either as a result of manufacturing errors or subsequent displacement can be reduced. This can result in a reduced manufacturing wastage and a reduction in failure of the apparatus during use.

It will be appreciated that, if the radiation image were larger than the area of the photodiodes, so that each photodiode was totally illuminated for all expected displacements of the imaging system then the present invention would not produce any advantage. However, if the distribution of illumination over the image were not constant (for example, the, center were brighter than the periphery) then the use of paired diagonal photodiodes would reduce the change in output on deflection. In practice, to ensure maximum utilization of the available radiation, the area of photodiodes is usually selected to be at least as large as the radiation image.

In practice, the outputs of the photodiodes are supplied to amplifiers the gains of which can be adjusted during calibration to ensure outputs of equal magnitudes. The present invention reduces the need to calibrate the amplifiers and reduces the need to recalibrate during use.

When used in pyrometer apparatus, the detector assembly could be incorporated into the same tube as the sighting head, where the temperature is not so high as to affect the performance of the photodiodes adversely.

The invention is not confined to pyrometers but could be used in other electro-optic apparatus where it is desired to produce a two-channel electrical output in response to optical radiation.

What I claim is:

1. In electro-optic apparatus of the kind including a detector and an imaging device that forms a radiation image on the detector, the improvement wherein the apparatus includes an array of at least two pairs of detectors, wherein the detectors of each pair are located diagonally opposite one another, and wherein the outputs of the detectors in each pair are connected together in respective ones of at least two channels such that no substantial change in the output of a channel is produced by a reduction in the area of radiation imaged on one detector and an equal increase in the area of radiation imaged on the other detector in the same pair.

2. Electro-optic apparatus according to claim 1, wherein the detectors are arranged in an orthogonal array, and wherein the imaging device forms a circular image substantially centrally of the array.

3. Electro-optic apparatus according to claim 1, wherein the detectors are of rectangular shape, and wherein the array is larger in one dimension than in a dimension at right angles to the one dimension.

4. Electro-optic apparatus according to claim 1, wherein the image is smaller than a dimension of the array.

5. Electro-optic apparatus according to claim 1, wherein the image is larger than a dimension of the array.

6. Electro-optic apparatus according to claim 1, wherein the detectors are photodiodes.

7. Electro-optic apparatus according to claim 1, wherein the detectors are mounted in thermal contact with a self-regulating heater.

8. Electro-optic apparatus according to claim 1, wherein the detectors and a signal conditioning circuit are mounted in a casing, and wherein the casing has a connector at one end and a fiber-optic cable at its opposite end by which radiation is supplied to the detectors.

9. Radiation pyrometer apparatus comprising: an orthogonal array of four radiation detectors each of which provides an electrical output in accordance with the radiation incident on the detector; an imaging device that forms an image of radiation from a radiation-emitting body substantially centrally of the array; and means connecting together the outputs of diagonally opposite ones of the detectors in two channels representative of the temperature of the radiation-emitting body such that no substantial change in the output of a channel is produce by displacement of the image causing a reduction in the area of radiation imaged on one detector and an equal increase in the area of radiation imaged on the other detector.

10. Radiation pyrometer apparatus according to claim 9, wherein the apparatus includes a fiber optic cable by which radiation from the radiation-emitting body is supplied to the imaging device.

* * * * *